(12) United States Patent
Bird et al.

(10) Patent No.: US 7,735,546 B2
(45) Date of Patent: Jun. 15, 2010

(54) HEAT EXCHANGER BYPASS VALVE HAVING TEMPERATURE INSENSITIVE PRESSURE BYPASS FUNCTION

(75) Inventors: Norm J. Bird, Plymouth, MI (US); James T. Gooden, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 504 days.

(21) Appl. No.: 11/584,363

(22) Filed: Oct. 20, 2006

(65) Prior Publication Data

US 2008/0093066 A1 Apr. 24, 2008

(51) Int. Cl.
*G05D 23/00* (2006.01)

(52) U.S. Cl. ............... 165/297; 236/34.5; 236/92 C
(58) Field of Classification Search ............ 165/297; 236/34.5, 92 C
See application file for complete search history.

(56) References Cited

U.S. PATENT DOCUMENTS

| | | | |
|---|---|---|---|
| 5,048,751 A * | 9/1991 | DuBois | 236/92 C |
| 5,228,618 A * | 7/1993 | Afshar | 236/34.5 |
| 5,738,276 A * | 4/1998 | Saur | 236/92 C |
| 6,253,837 B1 * | 7/2001 | Seiler et al. | 165/103 |
| 6,935,569 B2 * | 8/2005 | Brown et al. | 236/34.5 |

* cited by examiner

*Primary Examiner*—Ljiljana (Lil) V Ciric
(74) *Attorney, Agent, or Firm*—David B. Kelley; MacMillan, Sobanski & Todd, LLC

(57) ABSTRACT

A by-pass valve for a heat exchanger circuit includes a chamber, a fixed surface secured against movement relative to the chamber, a by-pass port including a valve seat located in the chamber, an actuator located in the chamber and that moves relative to the valve seat in response to a temperature of the actuator, a valve member, a spring contacting the surface and the valve seat and producing a force urging the valve member to engage the valve seat and to close the by-pass port, the spring having no structural connection to the actuator, and a return spring secured to the actuator and contacting the valve member for urging the actuator to retract and the valve member to open the by-pass port.

20 Claims, 2 Drawing Sheets

US 7,735,546 B2

HEAT EXCHANGER BYPASS VALVE HAVING TEMPERATURE INSENSITIVE PRESSURE BYPASS FUNCTION

BACKGROUND OF THE INVENTION

1. Field of the Invention

This invention relates generally to a heat exchanger circuit, and, in particular, to a bypass valve having a pressure bypass function that is insensitive to temperature changes of fluid in the circuit.

2. Description of the Prior Art

At low temperatures and while the engine of a motor vehicle is warming-up, transmission fluid is highly viscous, resulting in nearly no flow through an oil the cooler. High viscosity and low flow rate can compromise transmission durability because cooler return oil is usually routed to the transmission lubrication circuit.

A variety of thermal bypass valves have been designed to allow oil to bypass the cooler and return to the transmission to maintain desired flow rates to the lubrication circuit. Many of these valves use a thermal motor/actuator to actuate the valve to provide this function. When the transmission is hot, the thermal bypass valve closes. If the cooler is hot, the cooler and lubrication systems will function as intended. If, however, ambient temperature is very cold, oil in the cooler remains cold, and oil flow will is low.

A variety of thermal bypass valves have been developed to allow a pressure bypass function, wherein the valve opens to bypass the cooler when the oil temperature is high and the pressure drop across the cooler exceeds a designed threshold. However, an inherent problem exists in many of these thermal bypass valves with pressure bypass functions. Most will provide the desired function with features that involve a spring load balanced against a piston, washer or valve having a piston shape and piston function with a pressure differential across it. Many of these valves have a spring load that is grounded to the thermal motor/actuator, which continues to move as the oil temperature increases. This grounded relation causes the spring load to be a function of temperature and the pressure relief temperature is also a function of temperature.

Unfortunately, when the oil is very hot and the ambient air conditions are such that the cooler is still frozen and not flowing oil, these shortcomings cause the pressure difference to be so high that the pressure bypass function will not be available, and the transmission is at risk due to a lack of lubricating oil.

SUMMARY OF THE INVENTION

A by-pass valve for a heat exchanger circuit includes a chamber, a fixed surface secured against movement relative to the chamber, a by-pass port including a valve seat located in the chamber, an actuator located in the chamber and that moves relative to the valve seat in response to a temperature of the actuator, a valve member, a spring contacting the surface and the valve seat and producing a force urging the valve member to engage the valve seat and to close the by-pass port, the spring having no structural connection to the actuator, and a return spring secured to the actuator and contacting the valve member for urging the actuator to retract and the valve member to open the by-pass port.

The by-pass valve corrects the problem of variability in pressure induced bypass by grounding the over-pressurization spring directly to the valve housing, rather than to the thermal motor/actuator, as in existing designs. In conventional by-pass valves, the spring is grounded against the thermal motor/actuator, which continues to move as oil temperature increases, resulting in a higher pressure drop to invoke bypass at higher oil temperatures.

In the preferred by-pass valve, the spring force is not defined by the position of the thermal motor/actuator after the valve closes. Instead, the spring is compressed in a space between the valve cap and the valve member. The axial length of this space does not change after the valve closes and temperature continues to increase. Therefore, regardless of the operating temperature of the oil, the pressure drop across the cooler bypass is the same. The preferred by-pass valve produces a consistent cooler pressure drop threshold after the valve closes.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
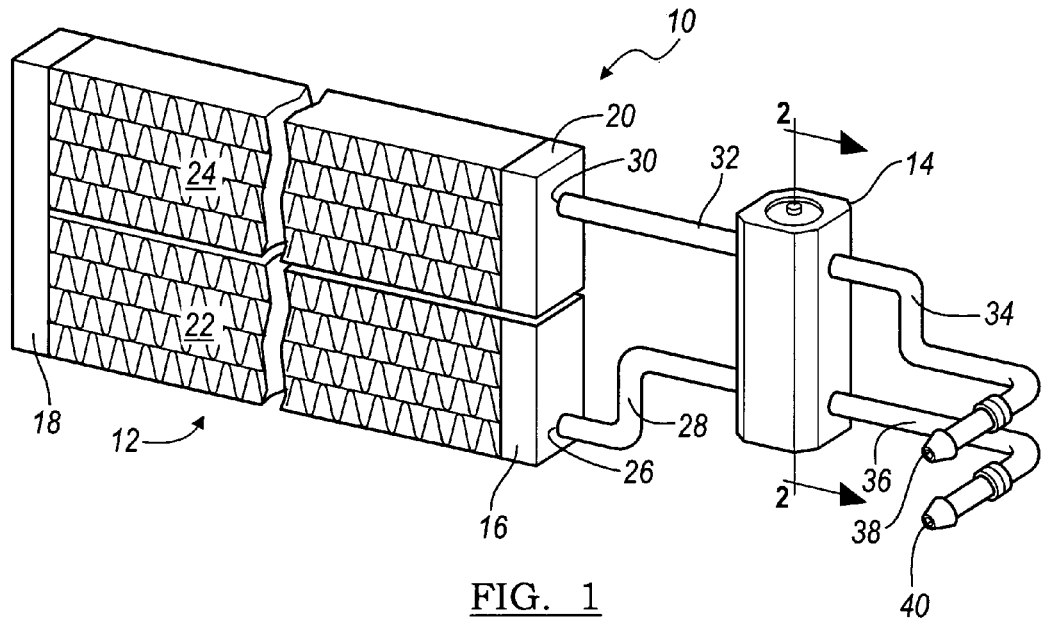
FIG. 1 is a perspective, schematic view of a heat exchanger employing a by-pass valve.

Referring to FIG. 1, a heat exchange circuit 10 includes a heat exchanger 12 of any type, and a by-pass valve 14. In FIG. 1, a two-pass heat exchanger has a first manifold 16, which could be an inlet or an outlet manifold, a return manifold 18, and a second manifold 20. Spaced-apart heat exchange conduits 22, 24 are connected between the manifolds such that, if first manifold 16 is an inlet manifold, fluid flows from inlet manifold 16 through conduits 22 into return manifold 18, where it reverses direction and flows back through conduits 24 to second manifold 20, which is then an outlet manifold. The flow direction can be reversed such that second manifold 20 is the inlet manifold and first manifold 16 is the outlet manifold. Heat exchanger 12 can be a single pass heat exchanger with manifolds 16, 20 located at respective ends of the heat exchanger, in which case, return manifold 18 would not be required.

If first manifold 16 is the inlet manifold, it is formed with an inlet opening 26, which communicates with an inlet conduit 28. If second manifold 20 is the outlet manifold, it is formed with an outlet opening 30, which communicates with an outlet conduit 32.

If the flow direction is reversed, conduit 32 becomes the inlet conduit and conduit 28 becomes the outlet conduit. Conduits 28, 32 are connected to inlet and outlet ports in by-pass valve 14, and supply conduits 34, 36 are also connected to ports in by-pass valve 14, as will be described further below.

Conduits 34, 36 have end fittings 38, 40 for attaching flow lines to conduits 34, 36. Where heat exchanger 12 is a transmission oil cooler, end fittings 38, 40 can be hose barbs for attaching rubber hoses between the transmission and heat exchange circuit 10. However, any type of end fittings 38, 40 can be used to suit the type of oil lines running to and from heat exchange circuit 10.

Figure 2:
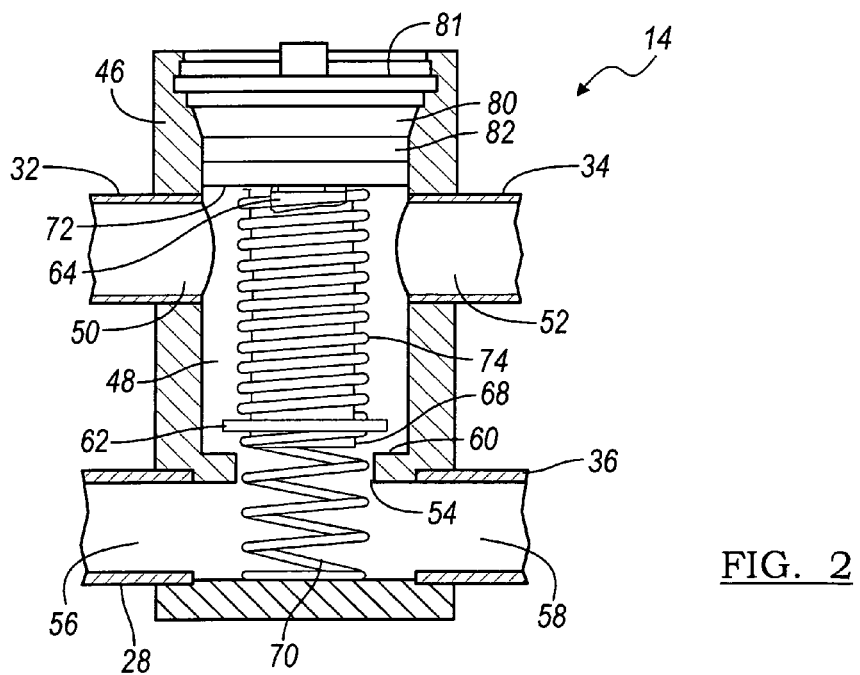
FIG. 2 is a sectional view taken at plane 2-2 of FIG. 1 showing the by-pass valve in its open state.
Figures 3, 4:
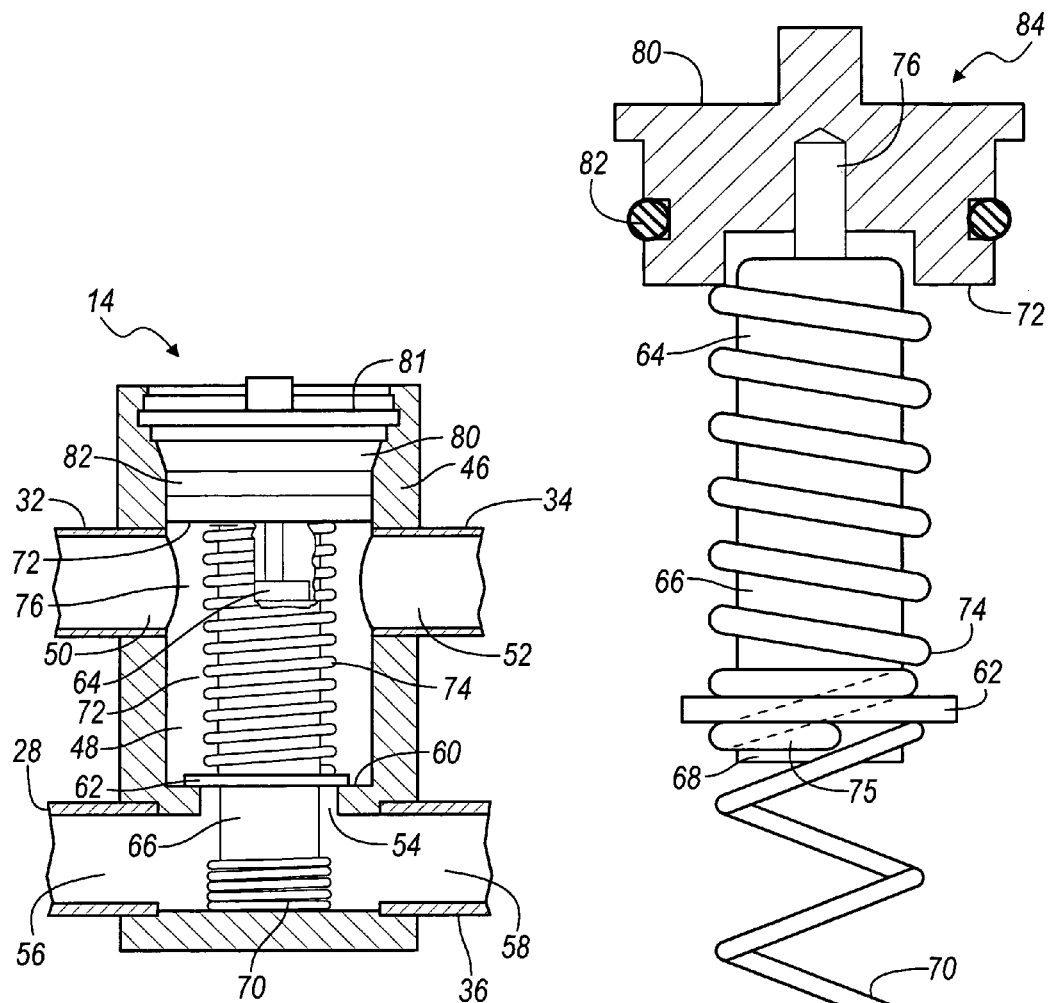
FIG. 3 is a sectional view similar to FIG. 2 but showing the by-pass valve in its closed state.
FIG. 4 is a side view, partly in cross section, of the valve cartridge or subassembly used in the by-pass valve of FIGS. 2 and 3.

By-pass valve 14 is referred to as a four port by-pass valve, because four conduits 28, 32, 34 and 36 are connected to by-pass valve 14. Referring next to FIG. 2 and 3, the four port by-pass valve 14 includes a housing 46 formed with a chamber 48. Housing 46 has main ports or openings 50, 52 and a valve port 54, which communicates with two lower branch ports 56, 58. Conduits 28, 36 are connected, respectively to the branch ports 56,58.

Valve port 54 has a peripheral valve seat 60 facing chamber 48. A movable valve member 62 is adapted to engage valve seat 60, thereby closing valve port 54, and to disengage valve seat 60, thereby opening valve port 54.

A temperature responsive thermal motor/actuator 64, located inside chamber 48, is encircled by a helical compression spring 74. A thermal motor/actuator 64, includes a piston located in a cylinder, which contains a thermal sensitive material, such as wax, which expands and contracts in response to its temperature, thereby causing the thermal motor/actuator to extend axially upon being heated to a predetermined temperature and to retract upon being cooled below the predetermined temperature. Where by-pass valve 14 is used in conjunction with an automotive transmission oil cooler, this predetermined temperature is such that the oil returning to the transmission from heat exchange circuit 10 is typically 70° C. to 100° C.

Referring next to FIGS. 2, 3 and 4, thermal motor/actuator 64 is located along a central axis of chamber 48. The cylinder of thermal motor/actuator 64 forms a central shaft 66 directed along the central axis of valve port 54 and surrounded by the coils of spring 74. The lower end of central shaft 66 is formed with a closed end portion 68, which partially closes valve port 54. Valve member 62 extends radially outward from the outer surface of central shaft 66 to engage valve seat 60 and close valve port 54, as indicated in FIG. 3.

The upper end of spring 74 contacts the lower surface 72 of closure 80, which is secured to housing 46. The lower end of spring 74 contacts valve member 62. Spring 74 is installed with a compression pre-load. Valve member 62 is in the form of an annular disc, which slides axially on central shaft 66 toward valve seat 60 due to the force continually applied by spring 74. The upper end 75 of a return spring 70 is secured to the closed end portion 68 by being inserted into a groove (not shown) formed in the closed end portion 68. The upper end 75 of return spring 70 moves with the central shaft 66, and the lower end of spring 70 is seated on a planar surface. Return spring 70 acts as a stop for preventing valve member 62 from sliding off central shaft 66.

Thermal motor/actuator 64 includes a piston 76, which is attached or press fitted into an axial recess 78 (see FIG. 4) formed in the removable closure 80, which is secured to housing 46. Closure 80, which includes an 0-ring seal 82, is secured to housing 46 by a suitable pin or set screw or other type of fastener, such as a "C"-clip or snap ring 81.

When thermal motor 64 reaches a predetermined temperature, piston 76 extends axially from its cylinder in the central shaft 66. Because the position of piston 76 is fixed, central shaft 66, which is part of thermal motor 64, moves axially downward through valve port 54, compressing return spring 70. The force of spring 74 causes valve member 62 to engage valve seat 60 and to close valve port 54. When the temperature inside chamber 48 drops below the reference temperature, piston 76 retracts into the central shaft 66. The return spring 70 urges central shaft 66 and valve element 62 upward, thereby lifting valve element 62 off valve seat 60, opening valve port 54, and compressing spring 74. When valve port 54 is opened as indicated in FIG. 3, return spring 70 extends through valve port 54 and into chamber 48, but it does not materially affect the flow through valve port 54.

As FIG. 4 shows, closure 80, thermal motor 64, coil spring 74, valve member 62 and return spring 70 form a cartridge or subassembly 84 for by-pass valve 14. When subassembly 84 is removed from by-pass valve 14, the various conduits can be attached, such as by brazing, to housing 46 without damaging thermal motor 64 or springs 70, 74. Cartridge 84 is then installed in housing 46 with closure 80 located opposite to valve port 54 and heat exchange circuit 10 is then ready for use.

The operation of by-pass valve 14 is now described with reference to FIGS. 1-4. Heat exchange circuit 10 can be operated with either conduit 34 or conduit 36 being the inlet conduit, the other one being the outlet conduit. When conduit 34 is the inlet conduit, i.e., when it receives hot transmission oil from the transmission, this condition is sometimes referred to as the normal flow condition. In this case, conduit 36 is the outlet conduit and returns the transmission oil to the transmission after it has been cooled in heat exchanger 12.

When conduit 36 is the inlet conduit receiving the hot transmission fluid or oil from the transmission and conduit 34 is the outlet or return conduit delivering cooled oil back to the transmission, this condition is sometimes referred to as the reverse flow condition.

Dealing first with the normal flow condition, if the temperature of transmission oil in heat exchange circuit 10 is above the reference temperature, by-pass valve 14 appears as in FIG. 3. Hot engine oil enters through inlet conduit 34 and passes in series through main port 52, chamber 48 and main port 50 to heat exchanger inlet conduit 32. The hot fluid passes through heat exchanger 12 and returns through outlet conduit 28, passes through branch ports 56, 58, exits through outlet conduit 36, and returns to the transmission. In this case, there is no by-pass flow, because valve port 54 is closed.

If the temperature of fluid returning to the transmission through conduits 28, 36 drops below the reference temperature, which is 70° C to 100° C, piston 76 of thermal motor/actuator 64 retracts causing valve member 62 to lift off valve seat 60 opening valve port 54. This creates by-pass flow from conduit 34, through chamber 48 and valve port 54, which flow joins flow in conduit 36 and returns to the transmission. If the temperature of the flow or oil is very cold, such as at engine start-up conditions, the oil may be so viscous that virtually no flow goes through heat exchanger 12, and the flow is totally by-passed from inlet conduit 34 to outlet conduit 36. As the temperature of the oil increases, flow through conduit 32 and heat exchanger 12 increases due to expansion of the thermal actuator/motor, until the oil temperature reaches the desired operating temperature. Then full flow occurs through heat exchanger 12, valve member 62 closes valve port 54, thereby discontinuing by-pass flow. When valve member 62 is disengaged from seat 60, valve port 54 becomes an outlet port. The other main ports 52 and 50 become respective inlet and outlet ports in this regular flow condition.

In the regular flow condition, branch port 56 becomes an inlet port, and branch port 58 becomes an outlet port communicating with inlet port 56. Valve port 54 becomes an outlet port for by-pass valve 14, and the other main ports 52 and 50 become, respectively, inlet and outlet ports for by-pass valve 14.

When operating in the reverse flow condition, conduit 36 becomes the inlet conduit receiving hot oil from the transmission, and conduit 34 becomes the outlet conduit returning the cooled transmission oil to the transmission. In the reverse flow condition, if the transmission and heat exchange circuit 10 are at operating temperatures, the hot transmission fluid passes through branch port 58, which becomes an inlet port. Valve member 62 is closed and there is no by-pass flow. The hot oil then continues through branch port 56, which becomes an outlet port communicating with inlet branch port 58. The hot oil flows through conduit 28 and the heat exchanger 12, returns through conduit 32, flows in series through second main port 50, chamber 48 and third main port 52, and flows out through conduit 34 to the transmission.

If the temperature of the transmission oil returning to the transmission drops below the reference temperature, thermal motor/actuator 64 causes valve member 62 to open, thereby creating by-pass flow from valve port 54 to main port 52 and conduit 34. Again, if the oil is extremely cold, such as at engine start-up conditions, very little, if any, flow passes through heat exchanger 12, and there is almost total by-pass through by-pass valve 14. As the temperature of the transmission oil increases, flow enters heat exchanger 12 and returns through conduit 32 to chamber 48 and back to the transmission through conduit 34. This causes thermal motor/actuator 64 to warm up faster than would otherwise be the case. As the transmission oil returning to the transmission through outlet conduit 34 reaches the references temperature, piston 76 of thermal motor/actuator 64 extends, closing valve member 62 and stopping the by-pass flow. During cold weather operation, it is possible that oil in the heat exchanger will still be very cold and highly viscous in spite of the transmission warming up. In this situation, it is possible that the valve will close, oil will not flow through the heat exchanger, and pressure will increase. The coil spring is designed such that in this situation, the valve member will lift off the valve seat and restore flow to the transmission. The pressure required to open the valve seat is independent of the operating temperature when operating temperature is greater than that required for the thermal motor/actuator 64 to close the valve.

The circuiting of the valve is such that the housing functions as a mixing chamber, in which the by-pass fluid stream and the heat exchanger outlet stream can mix in direct contact with the thermal motor/actuator, so that thermal transients are damped, and the thermal motor/actuator 64 is able to directly respond to the mixed oil temperature being returned to the transmission. Also during the transition between opening and closing, the hot by-pass stream and cooler oil cooler return stream are mixed, thereby dampening any temperature transients in the oil being returned to the transmission.

In the reverse flow configuration, valve port 54 becomes an inlet port for by-pass valve 14 and the other main ports 50, 52 become respective inlet and outlet ports for by-pass valve 14.

Because by-pass valve 14 is located in chamber 48 with oil continuously flowing there, thermal motor/actuator 64 reacts quickly to temperature changes in the oil, warming and cooling quickly. Also, if the transmission oil becomes over-heated or experiences a temperature spike, thermal motor/actuator 64 is not damaged, because it is always exposed to some return flow from heat exchanger 12 in chamber 48 in the reverse flow configuration, or in branch ports 56, 58 in the regular flow configuration. Further, if thermal motor/actuator 64 is overheated and tends to expand too far, it will not be damaged, because central shaft 66 can extend through valve port 54 as much as is required. Any physical stops or constraints to limit the expansion of thermal motor/actuator 64 should be effective in this function only outside the range of operating temperature.

By-pass valve 14 has three main ports. If valve port 54 is considered to be the first main port, conduits 28, 36 can be considered to be a first flow conduit communicating with valve port 54 and one of the inlet and outlet openings of heat exchanger 12, depending upon whether by-pass valve 14 is operated in the regular flow or reverse flow condition. Depending upon whether valve port 54 is connected to the inlet or the outlet of heat exchanger 12, a second main port, namely main port 50, is connected to the other of the inlet and outlet openings of heat exchanger 12. A second flow conduit, namely conduit 34, communicates with the third main port, namely main port 52 of by-pass valve 14. In the reverse flow configuration, the first flow conduit 28, 36 is the heat exchanger inlet. The second conduit 34 through conduit 32 becomes the heat exchanger outlet. In the regular flow condition, the first flow conduit 28, 36 becomes the heat exchanger outlet, and the second flow conduit 34 through conduit 32 becomes the heat exchanger inlet.

In accordance with the provisions of the patent statutes, the preferred embodiment has been described. However, it should be noted that the alternate embodiments can be practiced otherwise than as specifically illustrated and described.

What is claimed is:

1. A by-pass valve comprising:
   first and second ports;
   a bypass port through which the first and second ports communicate;
   an actuator that extends and retracts in response to a temperature;
   a valve member;
   a spring that expands when the actuator extends, producing a force urging the valve member to close the bypass port, the force being independent of temperature when the bypass port is closed; and
   a return spring urging the actuator to retract and the valve member to open the bypass port.

2. The by-pass valve of claim 1, wherein:
   the actuator further comprises a central shaft on which the valve member is fitted for movement relative the central shaft, and to which the return spring is secured; and
   a stop for preventing the valve member from sliding off the central shaft.

3. The by-pass valve of claim 1, wherein:
   the actuator further comprises a central shaft; and
   the spring is a helical compression spring including coils that surround the central shaft, a first end contacting the valve member and a second end contacting a fixed surface.

4. The by-pass valve of claim 1, wherein:
   the actuator further comprises a central shaft on which the valve member is fitted for movement relative the central shaft; and
   the actuator is a thermal motor that moves the central shaft axially in a first direction in response to temperature above a reference temperature and moves the central shaft axially in a second direction opposite the first direction in response to temperature below a reference temperature.

5. The by-pass valve of claim 1 wherein:
   the housing includes a closure secured against axial movement and spaced from the valve port;
   the actuator further includes:

a central shaft on which the valve member is fitted for movement relative the central shaft, a thermal motor that moves the central shaft axially in a first direction in response to temperature above a reference temperature and moves the central shaft axially in a second direction opposite the first direction in response to temperature below a reference temperature; and a piston secured to and extending from the central shaft and contacting the closure, a length of the piston that extends from the central shaft increasing axially and moving the central shaft axially in a first direction in response to temperature above a reference temperature, said piston length decreasing axially in a second direction opposite the first direction in response to temperature below a reference temperature.

6. The by-pass valve of claim 1 wherein the housing further includes:

a third port communicating continually with the first port; and a fourth port communicating continually with the second port.

7. The by-pass valve of claim 1 wherein:

the housing includes a closure secured against axial movement and spaced from the valve port, the spring contacting the closure and the valve member; and the actuator includes a piston that contacts the closure, extends axially in a first direction in response to temperature above a reference temperature, and retracts axially in a second direction opposite the first direction in response to temperature below a reference temperature.

8. A by-pass valve comprising:

a fixed surface;

a by-pass port that opens and closes communication between first and second ports in response to temperature;

an actuator that extends and retracts in response to temperature;

a valve member;

a spring contacting the fixed surface, expanding when the actuator extends, producing a force urging the valve member to close the bypass port, the force being independent of temperature when the bypass port is closed; and a return spring urging the actuator to retract and the valve member to open the bypass port.

9. The by-pass valve of claim 8, wherein the actuator includes a piston that contacts the fixed surface, extends axially in a first direction in response to temperature above a reference temperature, and retracts axially in a second direction opposite the first direction in response to temperature below a reference temperature.

10. The by-pass valve of claim 8, wherein:

the actuator further comprises a central shaft on which the valve member is fitted for movement relative the central shaft, and to which the return spring is secured; and a stop for preventing the valve member from sliding off the central shaft.

11. The by-pass valve of claim 8, wherein:

the actuator further comprises a central shaft; and the spring is a helical compression spring including coils that surround the central shaft, a first end contacting the valve member and a second end contacting the fixed surface.

12. The by-pass valve of claim 8, wherein:

the actuator further comprises a central shaft on which the valve member is fitted for movement relative the central shaft; and the actuator is a thermal motor that moves the central shaft axially in a first direction in response to temperature above a reference temperature and moves the central shaft axially in a second direction opposite the first direction in response to temperature below a reference temperature.

13. The by-pass valve of claim 8 wherein the actuator further includes:

a central shaft on which the valve member is fitted for movement relative the central shaft, a thermal motor that moves the central shaft axially in a first direction in response to temperature above a reference temperature and moves the central shaft axially in a second direction opposite the first direction in response to temperature below a reference temperature; and a piston secured to and extending from the central shaft and contacting the fixed surface, a length of the piston that extends from the central shaft increasing axially and moving the central shaft axially in a first direction in response to temperature above a reference temperature, said piston length decreasing axially in a second direction opposite the first direction in response to temperature below a reference temperature.

14. The by-pass valve of claim 8 further comprising:

first and second ports communicating with the chamber and located on axially opposite sides of the valve seat, the first and second ports communicating mutually through the valve seat;

a third port communicating continually with the first port; and a fourth port communicating continually with the second port.

15. A heat exchanger comprising:

an inlet manifold having an inlet opening and an outlet manifold having an outlet opening;

heat exchange conduits spaced mutually and connected between the inlet and outlet manifolds;

by-pass valve including a chamber;

a fixed surface secured against movement relative to the chamber;

a by-pass port including a valve seat located in the chamber, opening and closing communication between first and second ports in response to temperature;

an actuator located in the chamber and that moves relative to the valve seat in response to temperature;

a valve member;

a spring contacting the fixed surface, expanding when the actuator extends, and producing a force urging the valve member to close the bypass port, the force being independent of temperature when the bypass port is closed; and a return spring urging the actuator to retract and the valve member to open the bypass port.

16. The heat exchanger of claim 15, wherein the actuator includes a piston that contacts the fixed surface, extends axially in a first direction in response to temperature above a reference temperature, and retracts axially in a second direction opposite the first direction in response to temperature below a reference temperature.

17. The heat exchanger of claim 15, wherein:

the actuator further comprises a central shaft on which the valve member is fitted for movement relative the central shaft, and to which the return spring is secured; and a stop for preventing the valve member from sliding off the central shaft.

18. The heat exchanger of claim 15, wherein:

the actuator further comprises a central shaft; and the spring is a helical compression spring including coils that surround the central shaft, a first end contacting the valve member and a second end contacting the fixed surface.

19. The heat exchanger of claim 15, wherein:

the actuator further comprises a central shaft on which the valve member is fitted for movement relative the central shaft; and the actuator is a thermal motor that moves the central shaft axially in a first direction in response to temperature above a reference temperature and moves the central shaft axially in a second direction opposite the first direction in response to temperature below a reference temperature.

20. The heat exchanger of claim 15 wherein the actuator further includes:

a central shaft on which the valve member is fitted for movement relative the central shaft, a thermal motor that moves the central shaft axially in a first direction in response to temperature above a reference temperature and moves the central shaft axially in a second direction opposite the first direction in response to temperature below a reference temperature; and a piston secured to and extending from the central shaft and contacting the fixed surface, a length of the piston that extends from the central shaft increasing axially and moving the central shaft axially in a first direction in response to temperature above a reference temperature, said piston length decreasing axially in a second direction opposite the first direction in response to temperature below a reference temperature.

* * * * *